United States Patent [19]

Yamanaka et al.

[11] Patent Number: 5,789,533
[45] Date of Patent: Aug. 4, 1998

[54] POLYARYLENE SULFIDE, A PROCESS FOR THE PREPARATION THEREOF AND A COMPOSITION COMPRISING THE SAME

[75] Inventors: Hidenori Yamanaka; Osamu Komiyama, both of Chiba-ken; Masaru Miyoshi, Kanagawa-ken; Yoshitaka Anazawa, Chiba-ken; Naohiro Mikawa, Tokyo; Kazuhiro Ichikawa, Kanagawa-ken, all of Japan

[73] Assignee: Tonen Chemical Corporation, Tokyo, Japan

[21] Appl. No.: 671,360

[22] Filed: Jun. 27, 1996

[30] Foreign Application Priority Data

Jun. 29, 1995 [JP] Japan ..................... 7-186438

[51] Int. Cl.⁶ .......................................... C08G 75/14
[52] U.S. Cl. .............................. 528/388; 528/389
[58] Field of Search ....................... 528/388, 389

[56] References Cited

U.S. PATENT DOCUMENTS

| 4,840,986 | 6/1989 | Inoue et al. | 524/436 |
| 5,235,034 | 8/1993 | Bobsein et al. | 528/485 |
| 5,239,054 | 8/1993 | Muneto et al. | 528/485 |

FOREIGN PATENT DOCUMENTS

| 64-89208 | of 0000 | Japan . |
| 57-70157 | 4/1982 | Japan . |
| 64-38211 | 2/1989 | Japan . |
| 1-081855 | 3/1989 | Japan . |
| 64-63115 | 3/1989 | Japan . |
| 7-70320 | 3/1995 | Japan . |

*Primary Examiner*—Melvyn I. Marquis
*Attorney, Agent, or Firm*—William H. Dippert; Cowan, Liebowitz & Latman, P.C.

[57] ABSTRACT

A polyarylene sulfide in which a ratio of terminal —SX groups to a total of the terminal —SX groups and —SZn— groups is less than 20 mole %, wherein X represents an alkali metal or a hydrogen atom, and which has a melt viscosity, $V_6$ of 100 to 2,000 poises.

Also disclosed are a composition comprising 100 parts of the above polyarylene sulfide, 0.01 to 20 parts of zeolite and 0.01 to 20 part of silica, and a process for the preparation of the above polyarylene sulfide.

20 Claims, No Drawings

POLYARYLENE SULFIDE, A PROCESS FOR THE PREPARATION THEREOF AND A COMPOSITION COMPRISING THE SAME

FIELD OF THE INVENTION

The present invention relates to a polyarylene sulfide, a process for the preparation of the polyarylene sulfide, and a composition comprising the polyarylene sulfide.

PRIOR ART

There has been a need for a thermoplastic resin having high heat resistance and chemical resistance as a material for electric and electronic parts, auto parts and chemical apparatus parts. Recently, polyarylene sulfide (hereinafter referred to as PAS), typically polyphenylene sulfide (hereinafter referred to as PPS), draws attention as one of resins which meet such a need. However, this resin has a too high melt flowability and, herefore, has a disadvantage that it tends to form burrs too easily in a moulding process.

In view of the aforesaid disadvantage, Japanese Patent Application Laid-Open Sho-57 (or 1982)-70157 discloses a resin composition comprising a glass fiber of a specified size and PAS having a specified melt flow rate and a cross-linking rate. However, decrease in formation of burrs is still insufficient with that resin composition. In addition, its mechanical strength is insufficient, so that its application is restricted.

There are disclosed methods where at least one silane compound selected from aminoalkoxy silane, epoxyalkoxy silane, mercapto alkoxy silane and vinylalkoxy silane is added as a coupling agent to PAS in JP Applications Laid-Open Sho-64-38211, Sho-64-63115 and Sho-64-89208. Unfortunately, the occurrence of burrs is not sufficiently decreased yet.

In JP Application Laid-Open Hei-7 (or 1995)-70320, the present inventors, etc., disclose a process for the preparation of PAS by reacting an alkali metal sulfide with a dihaloaromatic compound in a polar aprotic solvent, wherein 0.001 to 0.1 mole of a zinc compound per mole of the alkali metal sulfide is added to a polymerization system or to an aftertreatment system of a polymerization slurry at any time between a time when a conversion of the dihaloaromatic compound reaches 30 % and an aftertreatment step of a polymerization slurry. That process is to provides PAS having high whiteness and a large melt viscosity.

BRIEF DESCRIPTION OF THE INVENTION

The present inventors have now unexpectedly found that in the process disclosed in aforesaid JP Application Laid-Open Hei-7-70320, PAS which shows remarkably less formation of burrs and excellent whiteness is obtained by setting a pH value in a specific range in a polymer slurry of the polymerization system or the aftertreatment step at a time of adding the zinc compound. The present inventors also have found a PAS composition having very high whiteness and excellent mechanical properties such as bending strength.

Thus, the present invention provides a polyarylene sulfide in which a ratio of terminal —SX groups to a total of the terminal —SX groups and —SZn— groups is less than 20 mole %, wherein X represents an alkali metal or a hydrogen atom, and which has a melt viscosity, $V_6$, of 100 to 2,000 poises.

The invention also provides a resin composition comprising 100 parts by weight of the aforesaid polyarylene sulfide, 0.01 to 20 parts by weight of zeolite, and 0.01 to 20 parts by weight of silica.

The invention further provides a process for the preparation of a polyarylene sulfide by reacting an alkali metal sulfide with a dihaloaromatic compound in an organic amide solvent, characterized in that a pH of a polymer slurry in a polymerization system or in an aftertreatment step is adjusted to a range of from 10.5 to 12.5, wherein the pH is measured after the slurry is diluted with six and a half times weight of water, and 0.001 to 0.1 mole of a zinc compound per mole of the starting alkali metal sulfide is added at any point of time from a time where a conversion of the dihaloaromatic compound reaches 90 % to the aftertreatment step.

PREFERRED EMBODIMENTS OF THE INVENTION

The ratio of the terminal —SX groups to a total of the terminal —SX groups and the —SZn— group is less than 20 mole %, preferably less than 15 mole %, more preferably less than 10 mole %. In the aforesaid range, the formation of burrs in molding of PAS is remarkably decreased. Above the aforesaid range, the formation of burrs cannot be decreased in molding. In this specification, the amount of the terminal —SX groups (mole %) is determined by the following equation:

Amount of the terminal —SX groups (mole %)=[an amount of the terminal —SX groups (mole/g)/a control amount of the terminal —SX groups (mole/g)]×100, wherein the control amount of the terminal —SX groups is the amount of the terminal —SX group contained in PAS which is prepared in the same conditions as in the preparation of PAS of the invention, with the exception that no zinc compound is added.

Quantitative analysis of the terminal —SX groups is carried out as follows. PAS powder is dried at 120° C. for 4 hours. Twenty grams of the dried PAS powder are added to 150 g of N-methyl-2-pyrrolidone and stirred vigorously at room temperature for 30 minutes not to leave coagulated powder. The slurry is filtered and washed seven times with each one liter of warm water of 80° C. The resulting filter cake is added to 200 g of pure water to form a slurry again. Then, the pH of the slurry is adjusted to 4.5 by adding 1N hydrochloric acid. The slurry is stirred at 25° C. for 30 minutes, filtered, and washed six times with each one liter of warm water of 80° C. The resulting cake is added to 200 g of pure water to form a slurry again, and titrated with 1N sodium hydroxide for quantitative analysis.

The upper limit of the melt viscosity, $V_6$, of the present PAS is 2,000 poises, preferably 1,200 poises, more preferably 600 poises. The lower limit is 100 poises, preferably 150 poises, more preferably 300 poises. If the melt viscosity exceeds the upper limit, moldability deteriorates. Meanwhile, below the aforesaid lower limit, the formation of burrs in molding is not decreased. In this specification, the melt viscosity, V6, is a viscosity in poise determined after the resin is held at 300° C. with a load of 20 kgf/cm² at a ratio of L to D of 10 in a flow tester.

In the process of the invention, the pH value is determined in the following manner: a sample slurry containing the polymer is taken from a polymerization system or an aftertreatment step, cooled to room temperature and diluted with six and a half times weight of water, and then the pH of the diluted slurry is measured.

A zinc compound is added to a polymer slurry in a polymerization system or in an aftertreatment step a pH of which slurry as determined as mentioned above is set in a range of from 12.5 (preferably 12.0, more preferably 11.5) to 10.5 (preferably 10.8, more preferably 11.0). Reaction of the zinc compound with the terminal —SX groups is expedited by setting the pH in the aforesaid range. If the pH exceeds the aforesaid upper limit, a polymerization slurry is filtered with difficulty to lower a treatment amount per hour and, moreover, the added zinc compound reacts preferentially with an alkali metal sulfide remaining in a polymerization system so that the effect of the feed of a zinc compound becomes smaller and the effects of the invention are not attained. Below the aforesaid lower limit, reaction between the zinc compound and the terminal —SX group is insufficient, so that the amount of the terminal —SX group exceeds the range of the invention and the formation of burrs in molding is not decreased. Adjustment of the pH may be conducted by adding, for instance, an aqueous sodium hydroxide solution to a polymer slurry in a polymerization system or in an aftertreatment step.

In an embodiment where a zinc compound is added to a polymerization system, a water content in the polymerization system after the addition of a zinc compound is preferably at most 1.4 moles, more preferably at most 1.3 moles, and preferably at least 0.9 mole, more preferably at least 1.0 mole, per mole of an alkali metal sulfide. If the water content exceeds the aforesaid upper limit, a zinc compound added reacts preferentially with an alkali metal sulfide remaining in the polymerization system, so that the reaction amount between the zinc compound and the terminal —SX groups is smaller and the terminal —SX groups remain more than specified by the invention. Below the aforesaid lower limit, a zinc compound added dissolves less, so that the amount of the reaction with terminal —SX groups is smaller and the terminal —SX groups remain more than specified by the invention. Adjustment of the water content may be conducted by adjusting the amount of water added in the aforesaid adjustment of the pH and in the feed of a zinc compound.

The feed of a zinc compound to a polymerization system in the present process should take place at or after a point of time when a conversion of a dihaloaromatic compound reaches 90%, preferably 95%. If a zinc compound is added before a conversion of 90% is attained, polymerization reaction is hindered, so that a melt viscosity of a resulting polymer is too small, the formation of burrs in molding is not decreased and, further, a polymer has a color of pink to red. A zinc compound may added to a polymer in an aftertreatment step.

In this embodiment, feed of a zinc compound may be carried out with more ease, but the effect is a little less. In an embodiment where a zinc compound is added to a polymerization system, the zinc compound can be added at a point of time of a desired conversation by knowing about the progress of a conversion of the dihaloaromatic compound with time in preparatory experiments. The zinc compound is added to a polymerization system preferably in a form of solution in a small amount of water or a water/organic amide solvent mixture. Then, heating and stirring are further continued at 220° to 270° C. for 5 minutes to 2 hours to proceed with polymerization. In an embodiment where a polyarylene sulfide is treated by adding a zinc compound to a polymer slurry in an aftertreatment step, it is preferred that a zinc compound (or its solution) is added to a polymer slurry obtained after the completion of polymerization before a solvent is removed from the polymer slurry by, e.g., flashing or filtration, which is then stirred at 30° to 270° C. for 10 minutes to 1 hour. The zinc compound used is preferably those soluble in the polymerization system or the slurry system, such as zinc chloride, zinc acetate, zinc sulfate and zinc sulfide. The amount of the zinc compound is at most 0.1 mole, preferably at most 0.05 mole, and at least 0.001 mole, preferably at least 0.005 mole. Below the aforesaid lower limit, the effects of the invention are not fully attained. Meanwhile, even if the amount exceeds the upper limit, the effects do not particularly increase and, moreover, there is a danger that a polymerization degree decreases in the case where the zinc compound is added to a polymerization system. Zinc chloride is particularly preferred as the zinc compound. When zinc chloride is used, it reacts with the terminal —SX group of PAS to form —SZnCl and —SZnS—.

The reaction of an alkali metal sulfide with a dihaloaromatic compound in an organic amide solvent may be conducted in any known manner. During the reaction, it is preferred to condense a part of a gaseous phase in a reactor by cooling a gaseous phase part of the reactor and to return it to a liquid phase, whereby depolymerization of PAS formed is avoided and, at the same time, PAS with a further higher molecular weight can be produced.

As a method to condense a part of a gaseous phase in a reactor by cooling a gaseous phase part of the reactor, the method described in JP Application Laid-Open Hei-5-222196 (U.S. Pat. No. 5,342,920) may be used.

The condensed and refluxed liquid has a higher water content compared to the liquid phase bulk, because of difference of the vapor pressures between water and an amide solvent. This reflux with a higher water content creates a layer having a higher water content in the upper part of the reaction mixture. As a result, larger amounts of remaining alkali metal sulfide (e.g., $Na_2S$), alkali metal halide (e.g., NaCl) and oligomers are contained in this layer. In conventional processes, formed polyarylene sulfide, starting materials such as $Na_2S$ and by-products are mixed together homogeneously at a high temperature of 230° C. or higher. In such conditions, high molecular weight polyarylene sulfide is not formed and, moreover, even once-formed polyarylene sulfide may be depolymerized to form lower molecular weight polymers and a noticeable amount of thiophenol as by-products. In this method, it is believed that the aforesaid unfavorable phenomena may be avoided, factors which interfare with reaction may be excluded very effectively and high molecular weight polyarylene sulfide may be obtained by actively cooling the gaseous phase part of a reactor and returning a large amount of a water-rich reflux to the upper part of the liquid phase. However, this method should not be restricted by the effects attained only by the aforesaid phenomena, but various effects caused by cooling the gaseous phase part may give high molecular weight polyarylene sulfide.

Addition of water in the middle course of the reaction is unnecessary in this method, unlike in conventional processes, but such addition of water is not precluded. However, some of the advantages of this method will be lost with operations of adding water. Accordingly, it is preferred that the whole water content in a polymerization system is constant in the course of the reaction.

A means of cooling the gaseous phase part of a reactor may be any cooling means known per se, such as external cooling or internal cooling, and preferably comprises an internal cooling coil mounted in an upper internal part of the reactor, an external cooling coil coiled on an upper outer wall of the reactor, a coolant jacket mounted on an upper outer wall of the reactor, a reflux condenser mounted above the reactor or a unit for spraying or blowing a liquid or gas (e.g., air or nitrogen gas) directly to an upper outer wall of the reactor. Any other means may also be applied as long as they have an effect of increasing the amount of a reflux in the reactor. When a surrounding temperature is comparatively low (e.g. normal temperature), proper cooling may be done by removing heat insulating materials from the upper part of a conventional reactor.

In the case of the external cooling, a water/amide solvent mixture condensed on the wall of a reactor may fall down along the wall to reach the upper part of the liquid phase in a reactor. Then, such a water-rich mixture remains there and maintains the water content in the upper part relatively higher. In the case of the internal cooling, a mixture condensed on the cooling surface may fall down along the surface of a cooling unit or the wall of a reactor and reaches the upper part of the liquid phase in a reactor, likewise.

Meanwhile, the temperature of a liquid phase bulk is maintained constant at a predetermined value, or controlled in accordance with a predetermined temperature profile. In the case where the temperature is constant, reaction is preferably carried out at a temperature of 230° to 275° C. for 0.1 to 20 hours, more preferably 240° to 265° C. for 1 to 6 hours. It is advantageous to apply a reaction temperature prefile having at least two steps in order to obtain higher molecular weight polyarylene sulfide. The first step is preferably conducted at a temperature of 195° to 240° C. in the two steps operations. If the temperature is lower, a reaction rate is too late to be practical. If it exceeds 240° C., a reaction rate is too fast to obtain sufficiently high molecular weight polyarylene sulfide and moreover, rates of side reactions increase noticeably. The first step is preferably ended at a time when a ratio of the remaining dihaloaromatic compound to the charged one in the polymerization system is 1 to 40 mole % and the molecular weight reaches a range of from 3,000 to 20,000. The ratio of 2 to 15 mole % and a molecular weight range of from 5,000 to 15,000 are more preferred. If the ratio exceeds 40 mole %, side reactions such as depolymerization tend to occur in a subsequent second step. If it is less than 1 mole %, it is difficult to obtain high molecular weight polyarylene sulfide finally. Then, the temperature is increased and in a final step, the reaction is preferably carried out at a reaction temperature of 240° to 270° for 1 to 10 hours. If the temperature is lower, sufficiently high molecular weight polyarylene sulfide cannot be obtained. If the temperature exceeds 270° C., side reactions such as depolymerization tend to occur and it is difficult to stably prepare high molecular weight product. In practice, a water content in a polymerization system is brought to a predetermined value by dehydration or addition of water at need in an atmosphere of inert gas. The water content is preferably 0.5 to 1.39 moles, more preferably 0.8 to 1.2 moles, per mole of alkali metal sulfide. If it exceeds 1.39 moles, the total amount of water including water added in the pH adjustment will exceed 1.4 moles and, therefore, an operation is necessary to adjust the water amount in the system, for instance, by flashing, before a zinc compound is added. Thus, procedures are complicated. If it is less than 0.5 mole, the reaction rate is too fast to obtain sufficiently high molecular weight one, and unfavorable reactions such as side reaction may occur.

In the case of one step reaction at a constant temperature, cooling of the gaseous phase part during the reaction should be started, at latest, below 250° C. in the middle course of temperature rise, but preferably started at the beginning of the reaction. In the case of the multi steps reaction, the cooling is preferably started in the middle course of temperature rise after a first step reaction, but more desirably started in a first step reaction. Pressure in a reactor is usually a most proper measure for a degree of a cooling effect. An absolute value of pressure depends upon characteristics of a reactor, stirring conditions, water content in a reaction system, a mole ratio of a dihaloaromatic compound to alkali metal sulfide and so on. However, a decreased reactor pressure, compared to that in the same reaction conditions except the absence of the cooling, means that the amount of a reflux is increased and the temperature at the gas-liquid interface of a reaction solution is lowered. It is thought that a relative decrease in pressure indicates extent of separation between a layer with a larger water content and the remaining layer. Accordingly, the cooling is preferably done to such an extent that an internal pressure in a reactor is lower than that of the case where the cooling is not conducted. A person skilled in the art may determine the extent of the cooling, depending upon equipments used and operation conditions.

Polyarylene sulfide with a desired melt viscosity may be prepared by selecting the aforesaid reaction conditions.

Organic amide solvents to be used in the invention are those known for the polymerization of polyphenylene sulfide and include, for instance, N-methyl pyrrolidone (hereinafter, NMP), N, N-dimethyl formamide, N, N-dimethyl acetamide, N-methyl caprolactame and mixtures thereof with NMP being preferred. All of these have vapor pressure lower than that of water.

Alkali metal sulfides to be used in the invention are also known and include, for instance, lithium sulfide, sodium sulfide, potassium sulfide, rubidium sulfide, cesium sulfide and mixtures thereof. These may be hydrated or in a form of an aqueous solution. Alternatively, hydrosulfides or hydrates thereof corresponding to these may be neutralized with each corresponding hydroxide into the corresponding sulfides and used. Sodium sulfide which is less expensive is preferred.

Dihaloaramatic compounds to be used in the invention may be selected from ones described in Japanese Patent Publication Sho-45 (or 1970)-3368. p-Dichlorobenzene is preferred. Further, a small amount (20 mole % or less) of one or more of p-, m-, or o- dihalogenated ones of dyphenyl ether, diphenyl sulfone and biphenyl may be used to prepare copolymers, such as o-dichlorobenzene, p,p'-dichlorodiphenyl ether, m,p'-dichlorodiphenyl ether, m,m'-dichlorodiphenyl ether, p,p'-dichlorodiphenyl sulfone, m,p'-dichlorodiphenyl sulfone, m,m'-dichlorodiphenyl sulfone, p,p'-dichlorobiphenyl, m,p'-dichlorobiphenyl and m,m'-dichlorobiphenyl.

Polyhalogenated compound, such as 1,3,5-trichlorobenzene and 1,2,4-trichlorobenzene, may also be used preferably in an amount of 0.005 to 1.5 mole %, more preferably 0.02 to 0.75 mole %, based on the alkali metal sulfide, in order to raise the molecular weight of polyarylene sulfide (PAS).

The PAS thus prepared is separated from by-products in aftertreatment known to those of ordinary skill.

Preferably, the PAS thus prepared is washed with an organic amide solvent and filtered; the resultant filter cake containing the solvent is heated at 150° to 250° C. in an atomospher of a non-oxidizing gas to remove the solvent and is further washed with water.

The aforesaid washing with an organic amide solvent is preferably conducted in a manner where a PAS slurry formed in the aforesaid polymerization step is filtered and the resulting filter cake is dispersed in an organic amide solvent.

In an embodiment of the washing, a PAS slurry formed in the aforesaid polymerization step is filtered to obtain a PAS cake, which is then put into, preferably, a half to ten times weight of an organic amide solvent and stirred preferably at a temperature of from normal temperature to 180° C., preferably, for 10 minutes to 10 hours, followed by filtration. These stirring and filtration are repeated from one to ten times. The organic amide solvent to be used in the washing may be those named for the polymerization of PAS. The organic amide solvent may be same with or different from a particular one actually used in the polymerization of PAS. NMP is particularly preferred.

The removal of the solvent by heating a solvent-containing filter cake is preferably conducted in a manner where a solvent-containing filter cake after washed with an amide solvent is heated at a temperature of from 150° to 250° C., preferably 180° to 230° C., for preferably 0.5 to 20 hours, more preferably 1 to 10 hours in a flow of a non-oxidizing gas such as helium, argon, hydrogen and nitrogen, preferably a nitrogen gas flow containing less than 5.0% by volume of oxygen. The heating is preferably conducted at normal pressure to 3 atm., more preferably at normal pressure. If the heating temperature is below the aforesaid lower limit, a longer time is needed to remove the solvent, which reduces productivity. If the temperature exceeds the aforesaid upper limit, PAS will be disclored, which is unfavorable. The removal of the solvent by heating offers high productivity and low costs, compared to removal of the solvent by washing with water, because an operation of washing with water is omitted and a recovery ratio of the solvent is remarkably improved.

Subsequent washing with water may be conducted in a conventional manner. However, this is preferably carried out by dispersing the filter cake after the heating into water. For instance, a PAS cake resulting after the heating is put into, preferably, one to five times weight of water, stirred preferably at a temperature from normal temperature to 90° C., preferably for 5 minutes to 10 hours, and filtered. These stirring and filtration are repeated preferably two to ten times to remove the solvent and by-product salts adhering to the PAS to thereby complete the water washing. This manner of water washing realize more efficient washing with a less amount of water, compared to a washing manner where water is poured to a filter cake.

The PAS thus prepared may be subjected to treatment with acid in the present invention. The treatment with acid in the present invention is carried out preferably at a temperature of 100° C. or below, particularly from normal temperature to 80° C. If the temperature exceeds the upper limit, the molecular weight of PAS decreases during the acid treatment. A pH of an acid solution used in the acid treatment is preferably 3.5 to 6.0, more preferably 4.0 to 5.5. With such a pH, most of terminal —SA groups in the PAS treated are converted into terminal —SH groups, where A is an alkali metal. If the pH is below the above range, a larger amount of an acid is needed so as to raise costs.

If the pH exceeds the range, removal of the terminal alkali metal in PAS is insufficient. A period of time necessary for the acid treatment depends upon a treatment temperature and a concentration of an acid solution and is preferably at least 5 minutes, more preferably at least 10 minutes. With a period of time shorter than this, the terminal —SA groups in PAS are not sufficiently converted into terminal —SH groups. In the acid treatment, use may be made of, for instance, acetic acid, formic acid, oxalic acid, phthalic acid, hydrochloric acid, phosphoric acid, sulfuric acid, sulfurous acid, nitric acid, boric acid, and carbonic acid with acetic acid being preferred. The treatment decreases a content of alkali metals such as sodium as impurities in PAS. The polymer after the treatment in an acid solution is separated from the solution and, preferably, washed with water to remove the acid.

In an embodiment of the invention where PAS is treated with a zinc compound in aftertreatment, a zinc compound (or its solution) is preferably added to a polymer slurry obtained after the polymerization, and stirred at 30° to 270° C. for 10 minutes to 1 hour. Then, the PAS is separated and purified in a conventional manner and, preferably, further treated with an acid as mentioned above.

The PAS of the invention may optionally be blended with a filler. The amount of the filler is preferably 300 parts by weight or less, particularly 250 parts by weight or less. If the amount exceeds the upper limit, the moldability of the composition is bad. It is preferred to blend at least 20 parts by weight of the filler in order to raise mechanical strength. Any conventional fillers may be used, such as fibrous fillers, e.g., glass fibers, carbon fibers, wiskers, boson fibers, potassium titanate fibers, asbestos fibers, silicon carbide fibers, aramide fibers, ceramics fibers and metal fibers; particulate fillers, e.g., silicates such as mica and talc, carbonates, sulfates, metal oxides, glass beads and silica. These may be used alone or in combination of two or more of these. The fillers may be treated with a silane coupling agent or a titanate coupling agent, if needed.

A white pigments such as titanium oxide and zinc oxide may preferably be blended with the PAS of the invention. Its amount is preferably 30 parts by weight or less per 100 parts by weight of the PAS. Even if it is blended in excess of the upper limit, no further remarkable effect is not expected and, moreover, the cost rises. It is preferred to blend at least 0.1 part by weight of the white pigment in order to obtain good whiteness.

Further, it is preferred to blend an alkoxy silane with the present PAS. The alkoxy silane may be selected from, for instance, aminoalkoxy silane, epoxyalkoxy silane, mercaptoalkoxy silane and vinylalkoxy silane. Its amount is preferably in the range of from 0.01 part by weight to 3 parts by weight per 100 parts by weight of the PAS, whereby the moldability and mechanical properties of the PAS are improved.

Any other additives may be blended with the PAS, such as antioxidants, heat stabilizers, lubricants, releasing agents and colorants, if needed.

The aforesaid components may be mixed by any conventional means, such as mixers, e.g., Henschel mixer.

The PAS thus prepared is usually melt kneaded by an extruder, pelletized and, then, molded into a desired shape by, for instance, injection molding.

In the resin composition according to the invention, zeolite is crystalline aluminosilicate and is known to be represented by the following general formula:

$$x(M'_2, M'')O \cdot Al_2O_3 \cdot nSiO_2 \cdot mH_2O,$$

wherein $M'$ represents a monovalent metal such as alkali metal such as Li, Na and K or ammonium, alkylammonium, pyridinium, anilinium, hydrogen ion or the like; and $M''$ represents a divalent metal such as alkali earth metal such as Ca, Mg, Ba and Sr. Either one or both of $M'$ and $M''$ may be present. Preferably, $M''$ is calcium and $M'$ is substantially absent.

Natural and synthetic zeolites are both usable in the invention. Natural zeolites include analcite, wairakite, natrolite, mesolite, thomsonite, gonnardite, scolecite, edingtonite, gismondite, laumontite, mordenite, yugawalite, erionite, ashcroftine, heulandite, clinoptilolite, stibite, epistilbite, dachiardite, phillipsite, harmotome, gmelinite, chabazite, faujasite. Synthetic zeolites include A, X, Y and L type ones, mordenite and chabazite. Among those, synthetic zeolites may be preferably used. Commercially available synthetic zeolites may be used such as CS-100 and CS-100S (trade marks, Koh-sei Co.), AMT-25 (trade mark, Mizusawa Kagaku Kogyo Co.) and Mizukalizer ES (trade mark, ibid).

The zeolite is preferably of a powdery particulate form with a preferred average particle size of at most 3 µm, more preferably at most 2.5 µm, particularly at most 2 µm. The lower limit of the average particle size is not particularly limited, but preferably 0.1 µm. If the average particle size exceeds the upper limit, the flowability of the resin composition and the bending strength of a molded article are lower, which is not preferred. In this context, the average particle size is a value determined by a coulter counter method ($D_{50}$). In a particle size distribution of the zeolite particles, particles of 5 µm or less in particle size amount to, preferably, at least 90% by weight. More preferably, particles of 3 µm or less in particle size amount to at least 95% by weight.

The amount of the zeolite is at most 20 parts by weight, preferably at most 15 parts by weight, more preferably at most 5 parts by weight, and at least 0.01 part by weight, preferably at least 0.1 part by weight, more preferably at least 1 part by weight, per 100 parts by weight of the PAS. If the amount exceeds the upper limit, cracks will occur in a molded article, mechanical strength such as bending strength decreases and, further, the flowability of the resin composition decreases. Below the aforesaid lower limit, it is impossible to raise the whiteness and the mechanical strength, such as bending strength, of a molded article.

An average particle size of the silica used in the resin composition is preferably at most 50 µm, more preferably at most 30 µm, particularly at most 10 µm, and preferably at least 1.0 µm, more preferably at least 1.5 µm, particularly at least 2 µm. In this context, the average particle size is a value determined by a coulter counter method ($D_{50}$). If the average particle size exceeds the aforesaid upper limit, bending strength of a molded article decreases. Below the lower limit, a melt viscosity, $V_6$, of the PAS resin composition increases to worsen its moldability. In a particle size distribution of the silica particles, particles of 80 µm or less in particle size amount to preferably 90% by weight or more. More preferably, particles of 60 µm or less in particle size amount to 95% by weight or more.

The silica preferably has a specific surface area of at most 1,500 m$^2$/g, more preferably at most 1,000 m$^2$/g, particularly at most 700 m$^2$/g, and at least 1 m$^2$/g, more preferably at least 2 m$^2$/g, particularly at most 2.5 m$^2$/g.

If the specific surface area exceeds the aforesaid upper limit, a melt viscosity, $V_6$, of the PAS resin composition is too large, so that its processability is worse. Below the lower limit, a bending strength of a molded article is lower, which is undesired. The specific surface area referred to herein is determined by a simplified BET method.

Any silica having the aforesaid properties may be used. Preferred is synthetic silica prepared by reaction of sodium silicate with an acid, such as MPS (trade mark) available from Nippon Kagaku Kogyo Co., Saisilia (trade mark) 730, 740, 770, 530, 540 and 550 available from Fuji Silicia Co.

The amount of the silica to be blended is at most 20 parts by weight, preferably at most 15 parts by weight, particularly at most 5 parts by weight, and at least 0.01 part by weight, preferably 0.1 part by weight, particularly 1 part by weight, per 100 parts by weight of the PAS. If the amount exceeds the upper limit, cracks will occur in a molded article, mechanical strength such as bending strength decreases and, further, the flowability of the resin composition decreases. Below the aforesaid lower limit, it is impossible to improve the whiteness.

The resin composition of the invention may optionally contain an inorganic filler. The inorganic filler includes powdery/flaky fillers and fibrous fillers, but are not limitted to those. The powdery/flaky fillers include alumina, talc, mica, kaoline, clay, titanium oxide, calcium carbonate, calcium silicate, calcium phosphate, calcium sulfate, magnesium oxide, magnesium phosphate, silicon nitride, glass, hydrotalcite, zirconium oxide, glass beads and carbon black. The fibrous fillers include glass fibers, asbestos fibers, carbon fibers, silica fibers, silica/alumina fibers, potassium titanate fibers, and aramide fibers. Besides these, other fillers may also be used, such as ZnO tetrapot, metal salts (e.g., zinc chloride and lead sulfate), oxides (e.g., iron oxides and molybdenum dioxide), and metals (e.g., aluminium and stainless stell). These may be blended alone or in combination of two or more of these. The surface of the inorganic filler may be treated with a silane coupling agent or a titanate coupling agent. The inorganic filler is blended in an amount of 300 parts by weight or less, preferably 200 parts by weight or less, per 100 parts by weight of the PAS. If the amount of the inorganic filler exceeds the above upper limit, the viscosity changes too much to mold the composition. It is preferred to blend at least 0.01 part by weight of it in order to raise mechanical strength.

Any known other additives or fillers may also be blended at need, such as antioxidants, UV absorbents, releasing agents, heat stabilizers, lubricants and colorants.

The resin composition of the invention may be prepared by mixing the components mechanically, melt kneading and extruding the mixture by any conventional apparatus such as an extruder around, for instance, 320° C., and pelletizing it, but any other process may also be used. The components may be mixed as a master batch in molding, or may be put separatedly in an extruder and melt kneaded.

The PAS or PAS composition of the invention may be used as materials for auto parts, electric and electronic parts and chemical apparatus parts, particularly for electric and electronic parts such as connectors.

The invention will further be explained in reference to the following Examples, but the invention shall not be restricted by the Examples.

EXAMPLES

A pH of a slurry was determined as follows: 20 g of a slurry (containing a polymer) is taken from a polymerization system, cooled to room temperature and diluted with 130 g of water; and the pH of the mixture is measured by a pH meter (F-2 from Horiba Seisakusho Co.).

A length of a burr was determined as follow: 60 parts by weight of polyarylene sulfide (PPS) and 40 parts by weight of glass fiber (trade mark 03MA497, from Asahi Glass Fiber Co.) are premixed by a Henschel mixer for 4 minutes, melt kneaded by a 35 mm diameter single screw extruder at a cylinder temperature of 320° C. at a rotation speed of 250 rpm and pelletized. The resultant pellets are molded into specimens of 50 mm in with, 70 mm in length and 3 mm in thickness by an injection molding machine set at a cylinder temperature of 320° C. and a mold temperature of 150° C. The length of a burr seen on a tip of the specimen is measured. Besides, another measurement was conducted in Comparison Example 2. That is, 0.5 part by weight of gamma-aminopropyl triethoxy silane was blended to 100 parts by weight of PPS, and 60 parts by weight of this blend and 40 parts by weight of the glass fiber are premixed, followed by the precedures mentioned above.

In the calculation of the amount of terminal —SX groups, the PPS obtained in Comparative Example 2 was a control PPS.

A melt viscosity of PPS, $V_6$, was measured using a flow tester, CFT-500C, from Shimazu Seisakusho Co.

Example 1

In a 150 liters autoclave were charged 15.400 kg of flaky sodium sulfide ($Na_2S$ content of 60.81% by weight) and 38.0 kg of N-methyl-2-pyrrolidone (hereinafter referred to as NMP). The temperature was elevated to 216° C. in a flow of nitrogen under stirring to distill off 3.843 kg of water. The autoclave was then sealed and cooled to 180° C., in which 17.640 kg of para-dichlorobenzene (hereinafter referred to as p-DCB) and 16.0 kg of NMP were charged. After pressurizing it to 1 kg/cm²G (i.e., gauge pressure) with nitrogen gas at a liquid temperature of 150° C., the temperature started to be raised up to a liquid temperature of 260° C. over 4 hours. When the liquid temperature reached 260° C., it was started to spray water over the upper part of the autoclave. This liquid temperature was maintained for 2 hours. Subsequently, 56.3 g of a 49 wt. % sodium hydroxide aqueous solution were fed under pressure by a pressure injection pump, whereby the pH of the polymerization system changed from 9.5 to 10.8. Then, a solution of 327 g of zinc chloride (0.02 mole per mole of sodium sulfide) dissolved in a mixture of 108 g of water and 216 g of NMP was fed under pressure by a pressure injection pump. When zinc chloride was fed, a conversion of p-DCB was 98.5%. The water content in the autoclave after the feed of zinc chloride was 1.06 moles per mole of sodium sulfide. Subsequently, the liquid temperature was lowered to 240° C., and maintained at that temperature for 30 minutes. Then, the liquid temperature started to be lowered and, at the same time, the cooling of the upper part of the autoclave was stopped. During the cooling of the upper part of the autoclave, the liquid was heated to maintain the liquid temperature at the specified temperatures. The maximum pressure during the reaction was 9.08 kg/cm²G.

When cooled to 110° C., the slurry was filtered. The resultant filter cake was put in 24 kg of NMP, stirred at normal temperature for half an hour, and then filtered. The filter cake was dried in a nitrogen flow at 220° C. for 7 hours. Then, operations of washing with warm water and filtration were repeated seven times, and the resultant filter cake was dried at 120° C. for 4.5 hours in a hot air ventilation drier to obtain a white powdery product, P-1, which was subjected to the measurement of properties.

Example 2

The procedures of Example 1 were repeated with the exception that the amount of the 49 wt. % sodium hydroxide aqueous solution was 70.0 g. The pH of the polymerization system changed from 9.8 to 11.2. The water content in the autoclave after the feed of zinc chloride was 1.07 moles per mole of sodium sulfide.

Properties of the resultant PPS, P-2, were determined.

Example 3

Polymerization was conducted as in Example 1, but the adjustment of the pH before the feed of zinc chloride and the feed of zinc chloride were not carried out.

Then, the liquid temperature was lowered to 150° C., and 56.3 g of a 49 wt. % sodium hydroxide aqueous solution was fed under pressure by a pressure injection pump, whereby the pH in the polymerization system changed from 9.5 to 10.8. Then, a solution of 327 g of zinc chloride (0.02 mole per mole of sodium sulfide) in a mixture of 108 g of water and 216 g of NMP was fed under pressure by a pressure injection pump. The water content in the autoclave after this feed was 1.06 moles per mole of sodium sulfide.

Then, the aftertreatment was conducted as in Example 1 to obtain a white powdery product, P-3, which was subjected to the measurement of properties.

Comparative Example 1

The procedures of Example 1 were repeated with the exception that the pH adjustment before the feed of zinc chloride, i.e., the feed of the 49 wt. % sodium chloride aqueous solution, was not carried out. The pH of the polymerization slurry before the feed of zinc chloride was 9.5.

Properties of the resultant PPS, R-1, were determined.

Comparative Example 2

The procedures of Example 1 were repeated with the exception that the pH adjustment before the feed of zinc chloride and the feed of zinc chloride were not carried out.

Properties of the resultant PPS, R-2, were determined.

Comparative Example 3

The polymerization was conducted as in Example 1. When cooled to 110° C. as in Example 1, the slurry was filtered. The resultant filter cake was put in 24 kg of NMP, stirred at normal temperature for half an hour, and filtered. The filter cake was dried in a nitrogen gas flow at 220° C. for 7 hours. The polymer thus obtained was put in 60 kg of warm water to form a slurry, to which 163.5 g of zinc chloride were then added, and heated to 90° C. and maintained at that temperature for 3 hours and filtered. Subsequently, washing with warm water and filtration were repeated seven times. The filter cake was dried at 120° C. for 4.5 hours in a hot air ventilation drier to obtain a white powdery product, R-3, which was subjected to the measurement of properties.

Comparative Example 4

The procedures of Example 1 were repeated with the exception that the amount of the 49 wt. % sodium hydroxide aqueous solution was 140.0 g. The pH in the polymerization system changed from 9.8 to 13.1 by the feed of the aqueous sodium hydroxide solution. The water content in the autoclave after the feed of zinc chloride was 1.08 moles per mole of sodium sulfide. The slurry thus obtained was filtered with very difficulty, so that the aftertreatment was not easy. Properties of the resultant white powdery product, R-4, were determined.

The above results are listed in Table 1.

TABLE 1

|  | Example | | | Comparative Example | | | | |
| --- | --- | --- | --- | --- | --- | --- | --- | --- |
|  | 1 | 2 | 3 | 1 | 2 | | 3 | 4 |
| PPS | P-1 | P-2 | P-3 | R-1 | R-2 | R-2 | R-3 | R-4 |
| Amount of the terminal -SX groups, mole % | 13.0 | 8.5 | 17.9 | 46.8 | 100 | | 78.7 | 54.3 |
| Melt viscosity, $V_6$, poise | 521 | 583 | 518 | 506 | 511 | | 535 | 590 |
| Burr length, μm | 39 | 18 | 45 | 132 | 450 | 175* | 150 | 128 |

*PPS(R-2), γ-aminopropyl triethoxy sialne and glass fiber were blended.

With the PPS's of Examples 1, 2 and 3 according to the invention, the length of burrs was short. In Example 2 where the pH in the polymerization system at the feed of zinc chloride was high in the range of the invention, compared to Example 1, the amount of —SX groups in PPS was less and the length of burrs was shorter. In Example 3 where zinc chloride was added to the polymerization system after the polymerization reaction, no large change was seen in the amount of —SX groups in PPS, the melt viscosity, $V_6$, and the length of burr, compared to Example 1.

Meanwhile, in Comparative Example 1 where the procedures of Example 1 were repeated, but no pH adjustment on the polymerization system before the feed of zinc chloride was conducted, that is, the pH in the polymerization system at the feed of zinc chloride is below the range of the invention, the amount of —SX groups in PPS was above the range of the invention and burrs were much longer than in Example 1. In Comparative Example 2 where no zinc chloride was fed, burrs were much longer than in Example 1. When γ-aminopropyl triethoxy silane was further blended in Comparative Example 2, burrs were much longer than in Example 1. In Comparative Example 3 where PPS was polymerized with no feed of zinc chloride, otherwise similarly as in Example 1 and the resultant PPS was washed with NMP and put in warm water to form a slurry to which zinc chloride was then fed without adjustment of the pH, the amount of —SX groups in the PPS was above the range of the invention and the length of burrs was much longer than in Example 1. In Comparative Example 4 where the pH in the polymerization system at the feed of zinc chloride was above the range of the invention and the other conditions were same as in Example 1, the amount of —SX groups in PPS was above the range of the invention and the burrs were much longer than in Example 1.

Examples 4 and 5 and Comparative Examples 5 to 17

The PPS's which were obtained in Example 1 and Comparative Examples 1 and 2 and designated as P-1, R-1 and R-2, respectively, were used. In addition, a cross-linked type of PPS, K-2 (trade mark, Tohpren Co., no —SZn-groups is contained) was also used.

The following zeolite, silica, glass fiber and additives were used.

Zeolite: CS-100, trade mark, Kohsei Co., in which sodium is exchanged with Ca in A type zeolite.

Silica: MPS, trade mark, Nippon Kagaku Kogyo Co. average particle size 20 μm, specific surface area 950 $m^2/g$.

Glass Fiber: CS 3PE945S, trade mark, Nitto Spinning Co.

Other Additives for Comparison:

organic phosphorus compound: PEP36, trade mark, Asahi Denka CO., white pigment: Dry Color HS-D 921285, trade mark, Dainichi Seika Co.

The components of the amounts indicated in Table 2 (weight part) were pre-mixed homogeneously for 5 minutes by a Henschel mixer, and melt kneaded at 300° C. by an extruder with 20 mm diameter twin screws rotating in opposite directions at 300 rpm and pelletized.

The properties were determined as follows.

Bending strength: the pellets prepared were fed to an injection molding machine, and molded into dumbbell test pieces at a cylinder temperature of 320° C. and a mold temperature of 130° C. Bending strength was measured on the test pieces in accordance with ASTM D 790.

Whiteness (L valve): Plates of a size of 30 mm×50 mm×1.5 mm were shaped in the same conditions as mentioned above. Whiteness (L valve) was measured on the plates by a color difference meter (SM-4, Suga Testing Machine Co.). The larger the L value, the higher the whiteness.

Formation of gas: the amount of gas withdrawn from a gas vent during the injection molding for producing the dumbbell pieces for the measurement of bending strength was measured. In Table 2, "VL" means that the amount of gas was very large; "L", large; and No. no gas.

The results are as shown in Table 2.

TABLE 2

|  | Example | | Comparative Example | | | | | | | | | | | | | |
| --- | --- | --- | --- | --- | --- | --- | --- | --- | --- | --- | --- | --- | --- | --- | --- | --- |
|  | 4 | 5 | 5 | 6 | 7 | 8 | 9 | 10 | 11 | 12 | 13 | 14 | 15 | 16 | 17 |
| Composition, part by weight |  |  |  |  |  |  |  |  |  |  |  |  |  |  |  |
| PPS |  |  |  |  |  |  |  |  |  |  |  |  |  |  |  |
| P-1 | 100 | 100 | 100 | 100 | 100 | 100 | 100 | — | 100 | 100 | 100 | 100 | 100 | — | — |
| R-2 | — | — | — | — | — | — | — | — | — | — | — | — | — | 100 | — |
| K-2 | — | — | — | — | — | — | — | 100 | — | — | — | — | — | — | — |
| R-1 | | | | | | | | | | | | | | | 100 |

TABLE 2-continued

| | Example | | Comparative Example | | | | | | | | | | | | |
|---|---|---|---|---|---|---|---|---|---|---|---|---|---|---|---|
| | 4 | 5 | 5 | 6 | 7 | 8 | 9 | 10 | 11 | 12 | 13 | 14 | 15 | 16 | 17 |
| Zeolite | 3 | 3 | — | — | — | — | 25 | 3 | 3 | 3 | — | 5 | — | 3 | 3 |
| Silica | 2 | 2 | — | — | — | — | 2 | 2 | 2 | — | 2 | — | 5 | 2 | 2 |
| Glass fiber | — | 66.7 | — | 66.7 | 66.7 | 66.7 | 66.7 | 66.7 | 350 | 66.7 | 66.7 | 66.7 | 66.7 | 66.7 | 66.7 |
| Comparative Component | | | | | | | | | | | | | | | |
| White pigment | — | — | — | — | 5 | — | — | — | — | — | — | — | — | — | — |
| Organic phosphorus component | — | — | — | — | — | 5 | — | — | — | — | — | — | — | — | — |
| Properties of the composition | | | | | | | | | | | | | | | |
| Whiteness, L value | 78 | 76 | 68 | 58 | 78 | 71 | —*1 | 56 | —*2 | 71 | 71 | 73 | 73 | 71 | 54 |
| Bending strength, MPa | 130 | 280 | 110 | 240 | 80 | 240 | — | 225 | — | 220 | 225 | 250 | 240 | 280 | 278 |
| Formation of gas | No | No | No | No | L | VL | — | No | — | No | No | No | No | No | No |

*1: Injection molding was impossible.
*2: Melt kneading was impossible.

The composition of Example 4 according to the invention showed excellent whiteness and bending strength, compared to Comparative Example 5 where the zeolite and the silica were not contained. In Example 5 where the glass fiber was further blended in an amount in the range of the invention, the whiteness decreases a little, compared to Example 4, but the effect of the invention was not destroyed, and the whiteness and the bending strength were both much better than in Comparative Example 6 where the zeolite and the silica were not contained.

In Comparative Example 7 where the zeolite and the silica were not contained and the white pigment was contained instead in Example 5, the whiteness was good, but the bending strength was very low, and the formation of gas during the injection molding was large. Comparative Example 8 where the zeolite and the silica were not contained and the organic phosphorus compound was contained instead in Example 5, the whiteness and the bending strength were both lower than in Example 5, and a remarkably large amount of gas was formed during the injection molding. In Comparative Example 9 where the amount of the zeolite blended exceeded the range of the invention, the resin composition could not be injection molded, so that its properties could not evaluated. In Comparative Example 10 where the cross-linked type of PPS (K-2) which contained no —SZn-groups was used instead of the PPS of the invention in Example 5, the whiteness and the bending strength were both very low. In Comparative Example 11 where the amount of the glass fiber blended exceeded the range of the invention, the resin composition could not be melt kneaded, so that its properties could not be evaluated. In Comparative Examples 12 and 13 where the silica or the zeolite was not contained in Example 5, respectively, their whitenesses and bending strengths were both lower than in Example 5. In Comparative Examples 14 and 15, the zeolite or the silica in the same amount as the total of the zeolite and the silica used in Example 5 was blended, respectively, their whitenesses and the bending strengths were both lower than in Example 5. Thus, it is seen that blending of the zeolite and the silica together in the range of the invention as shown in Example 5 leads to high whiteness and bending strength which are not attained by blending of the zeolite alone or the silica alone. In Comparative Example 16 where PPS (R-2) which contains no —SZn-groups was used instead of the PPS of the invention in Example 5, the whiteness was very low. In Comparative Example 17 where PPS (R-1) which contains —SX groups in an amount above the range of the invention was used instead of the PPS of the invention in Example 5, the whiteness was very low.

We claim:

1. A polyarylene sulfide in which a ratio of terminal —SX groups to a total of the terminal —SX groups and —SZn— groups is less than 20 mole %, wherein X represents an alkali metal or a hydrogen atom, and which has a melt viscosity, $V_6$, of 100 to 2,000 poises.

2. The polyarylene sulfide as claimed in claim 1, wherein the ratio of the terminal —SX groups to a total of the terminal —SX groups and the —SZn— groups is less than 15 mole %.

3. The polyarylene sulfide as claimed in claim 1, wherein the ratio of the terminal —SX groups to a total of the terminal —SX groups and the —SZn— groups is less than 10 mole %.

4. The polyarylene sulfide as claimed in claim 1, wherein the melt viscosity, $V_6$, is 150 to 1,200 poises.

5. The polyarylene sulfide as claimed in claim 1, wherein the melt viscosity, $V_6$, is 300 to 600 poises.

6. A resin composition comprising 100 parts by weight of the polyarylene sulfide of claim 1, 0.01 to 20 parts by weight of zeolite, and 0.01 to 20 parts by weight of silica.

7. The resin composition as claimed in claim 6, wherein the amount of the zeolite is in the range of from 0.1 to 15 parts by weight.

8. The resin composition as claimed in claim 6, wherein the amount of the zeolite is in the range of from 1 to 5 parts by weight.

9. The resin composition as claimed in claim 6, wherein the amount of the silica is in the range of from 0.1 to 15 parts by weight.

10. The resin composition as claimed in claim 6, wherein the amount of the silica is in the range of from 1 to 5 parts by weight.

11. The resin composition as claimed in claim 6, wherein the zeolite is in a form of particles having an average diameter of 0.1 to 3 μm.

12. The resin composition as claimed in claim 6, wherein the silica has a specific surface area of from 1 to 1,500 $m^2/g$ and an average diameter of from 1 to 50 μm.

13. A process for the preparation of a polyarylene sulfide by reacting an alkali metal sulfide with a dihaloaromatic compound in an organic amide solvent, characterized in that a pH of a polymer slurry in a polymerization system or in an aftertreatment step is adjusted to a range of from 10.5 to 12.5, wherein the pH is measured after the slurry is diluted with six and a half times weight of water, and 0.001 to 0.1 mole of a zinc compound per mole of a staring alkali metal sulfide is added at any point of time from a time where a conversion of the dihaloaromatic compound reaches 90% to the aftertreatment step.

14. The process as claimed in claim 13, wherein the pH is adjusted to a range of from 10.8 to 12.0.

15. The process as claimed in claim 13, wherein the pH is adjusted to a range of from 11.0 to 11.5.

16. The process as claimed in claim 13, wherein the zinc compound is added in the polymerization system after a conversion of a dihaloaromatic compound reaches 95%.

17. The process as claimed in claim 13, wherein the zinc compound is added in the polymerization system, and a water content in the polymerization system after the addition of the zinc compound is from 0.9 to 1.4 moles per mole of the starting alkali metal sulfide.

18. The process as claimed in claim 13, wherein the zinc compound is added in the polymerization system, and a water content in the polymerization system after the addition of the zinc compound is from 1.0 to 1.3 moles per mole of the starting alkali metal sulfide.

19. The process as claimed in claim 13, wherein the amount of the zinc compound is from 0.005 to 0.05 mole per mole of the starting alkali metal sulfide.

20. The process as claimed in claim 13, wherein the zinc compound is selected from the group consisting of zinc chloride, zinc acetate, zinc sulfate and zinc sulfide.

* * * * *